United States Patent
Wang et al.

(10) Patent No.: US 7,683,578 B2
(45) Date of Patent: Mar. 23, 2010

(54) ENERGY SAVING SYSTEM

(75) Inventors: Han-Che Wang, Guangdong (CN);
Shin-Hong Chung, Guangdong (CN);
Kuan-Hong Hsieh, Guangdong (CN);
Wen-Chuan Lian, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 679 days.

(21) Appl. No.: 11/308,979

(22) Filed: Jun. 1, 2006

(65) Prior Publication Data

US 2007/0028131 A1    Feb. 1, 2007

(30) Foreign Application Priority Data

Jul. 29, 2005    (CN) .................. 2005 1 0036280

(51) Int. Cl.
*H02J 7/00* (2006.01)
(52) U.S. Cl. .................. 320/132; 320/133; 320/134; 320/136
(58) Field of Classification Search .................. 320/132, 320/134, 136, 133
See application file for complete search history.

(56) References Cited

U.S. PATENT DOCUMENTS

| | | | |
|---|---|---|---|
| 5,814,972 A * | 9/1998 | Shimada et al. | 320/132 |
| 6,457,134 B1 * | 9/2002 | Lemke et al. | 713/323 |
| 6,586,911 B1 * | 7/2003 | Smith et al. | 320/134 |
| 6,647,501 B1 | 11/2003 | Ninomiya | |
| 2006/0053315 A1 * | 3/2006 | Menzl | 713/300 |

FOREIGN PATENT DOCUMENTS

| | | |
|---|---|---|
| TW | 365735 | 8/1999 |
| TW | 591392 | 6/2004 |
| TW | I235564 | 7/2005 |

\* cited by examiner

*Primary Examiner*—Edward Tso
*Assistant Examiner*—Johali A Torres Ruiz
(74) *Attorney, Agent, or Firm*—Winston Hsu

(57) ABSTRACT

An energy saving system used in an electronic device is provided. The energy saving system includes a battery for supplying the electronic device with energy; a energy detector for measuring a energy level of the battery, and transmitting a battery energy saving control signal when the measured energy level is equal to or less than a predetermined energy level; and a control unit for changing a predetermined first time period into a predetermined second time period which is shorter than the predetermined first time period according to the battery energy saving control signal, and controlling the electronic device to enter a sleep mode state when an elapsed time of not receiving any operations on the electronic device reaches the predetermined second time period.

7 Claims, 3 Drawing Sheets

ENERGY SAVING SYSTEM

CROSS-REFERENCES TO RELATED APPLICATION

This application relates to a contemporaneously filing application No. 11/308,978, entitled "ENERGY SAVING SYSTEM AND METHOD" having at least one common inventor and the same assignee with the instant application.

TECHNICAL FIELD

The present invention relates generally to energy saving systems and methods, and particularly to a system for saving energy of a battery.

GENERAL BACKGROUND

In recent years, as electronic devices decrease in size and thickness, portable electronic device, such as, notebook computers, mobile telephones, are widely used in today's business scenes. In the event that an alternating current (AC) power is not available, electronic devices, typically including notebook computers, will be electrically driven by rechargeable batteries loaded therein. It will thus, be desirable for most users that the electronic devices run longer before the battery runs down.

An approach in prolonging the battery drive time period is to precisely control the energy being consumed by a display unit of the electronic device. When a user does not use the electronic device over a time period, the display unit will enter a sleep mode.

However, in the described above approach the amount of energy saved is limited, which does not efficiently prolong the battery drive time.

Accordingly, what is needed is an energy saving system which can overcome the above-described problem and meet user's needs.

SUMMARY

An energy saving system used in an electronic device is provided. The energy saving system includes a battery, an energy detector, and a control unit. The battery is for supplying the electronic device with energy. The energy detector is for measuring a energy level of the battery of the electronic device, and transmitting a battery energy saving control signal when the measured energy level is equal to or less than a predetermined energy level. The control unit is for changing a predetermined first time period into a predetermined second time period which is shorter than the predetermined first time period according to the battery energy saving control signal, and controlling the electronic device to enter a sleep mode state when an elapsed time of not receiving any operations on the electronic device reaches the predetermined second time period.

An energy saving method used in an electronic device is also provided. The energy saving method includes the steps of: (a) measuring a energy level of a battery of the electronic device; (b) transmitting a battery energy saving control signal when the measured energy level is equal to or less than a predetermined energy level; (c) changing a predetermined first time period into a predetermined second time period that is shorter than the predetermined first period according to the battery energy saving control signal; and (d) controlling the electronic device to enter a sleep mode state when an elapsed time of not receiving any operations on the electronic device reaches the predetermined second time period.

Other advantages and novel features will be drawn from the following detailed description of the embodiments with reference to the attached drawings, in which:

DETAILED DESCRIPTION OF THE PREFERRED EMBODIMENT

Figure 1:
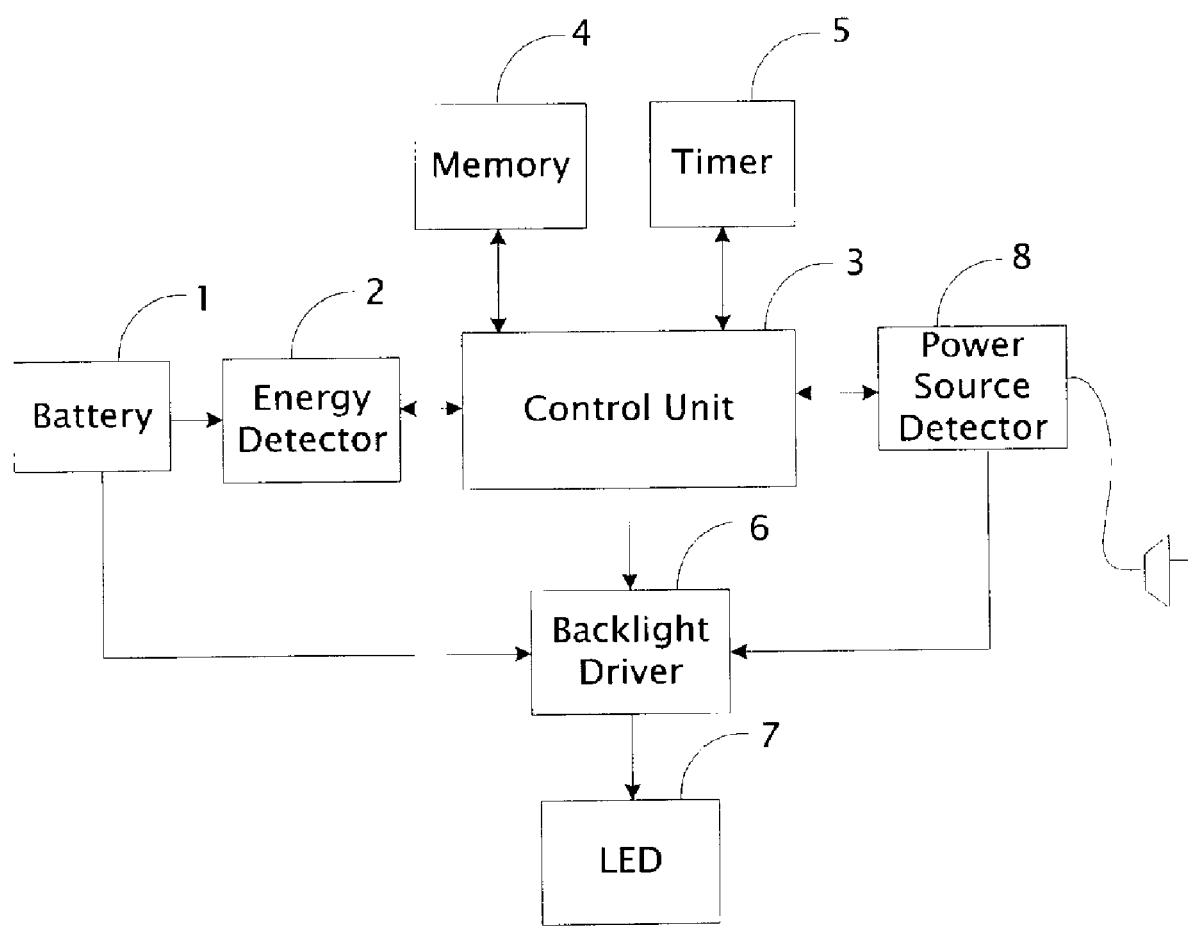
FIG. 1 is a block diagram of a hardware infrastructure of an energy saving system according to a preferred embodiment of the present invention.

FIG. 1 is a block diagram of a hardware infrastructure of an energy saving system (hereafter, "the system") according to a preferred embodiment of the present invention. The system can be used in any types of electronic device including, but not limited to, a mobile telephone, a notebook computer, a media player, a personal digital assistant (PDA), an E-book, and so forth. For simplicity, in the preferred embodiment, the following description will be provided with respect to a mobile telephone as the electronic device.

In the preferred embodiment, the system includes a battery 1, an energy detector 2, a control unit 3, a memory 4, and a timer 5. The memory 4 stores information used or generated by the mobile telephone, such as a plurality of predetermined parameters. The plurality of predetermined parameters include a predetermined energy level of the battery 1, a predetermined first time period, and a predetermined second time period. Each time period represents a time interval between a state of not receiving any operation on the mobile telephone and a sleep mode state of the mobile telephone. Therefore, when an elapsed time of not receiving any operations on the mobile telephone reaches the predetermined first time period, the mobile telephone enters the sleep mode state. In this preferred embodiment, the predetermined first time period is designated as a default time period for the mobile telephone. In addition, the predetermined first time period is a time length longer than the predetermined second time period. The battery 1 supplies energy for the mobile telephone. The energy detector 2 measures a energy level of the battery 1, and transmits a battery energy saving control signal to the control unit 3 when the measured energy level equals a predetermined energy level. The timer 5 tracks an elapsed time when no operation on the mobile telephone is received.

The control unit 3 changes the default time period for the mobile telephone from the predetermined first time period to the predetermined second time period according to the battery energy saving control signal, thereby shortening the time period before the mobile telephone enters the sleep mode state. Accordingly, when the elapsed time of not receiving any operation on the mobile telephone reaches the predetermined second time period, the control unit 3 controls the mobile telephone to enter the sleep mode state. In the sleep mode state, the display of the mobile telephone is turned off.

The system further includes a power source detector 8. The power source detector 8 detects whether a mains power source (not shown) is connected to (or another battery 1 is installed on (not shown)) the mobile telephone. If the mains power source is connected to the mobile telephone, the power source detector 8 generates a energy restoring control signal for restoring an initial voltage. The control unit 3 restores the predetermined first time period according to the energy restoring control signal.

Figure 2:
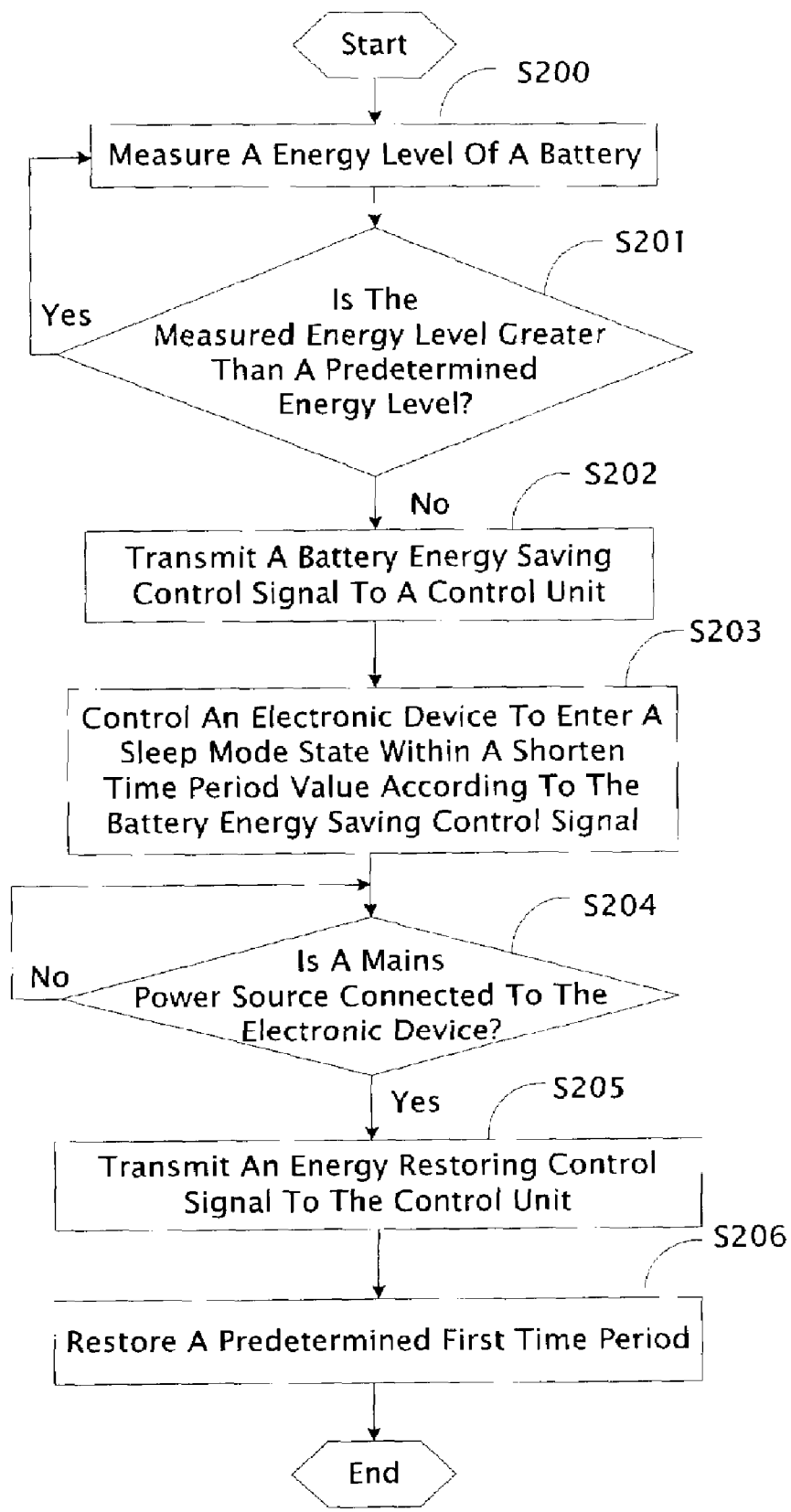
FIG. 2 is a flowchart of a preferred method of implementing the energy saving system of FIG. 1.

FIG. 2 is a flowchart of a preferred method of implementing the energy saving system of FIG. 1. In step S200, the energy detector 2 measures the energy level of the battery 1. In step S201, the energy detector 2 determines whether the measured energy level is greater than the predetermined energy level. If the measured energy level is greater than the predetermined energy level, the procedure returns to step S200 described above. If the measured energy level is equal to or less than the predetermined energy level, in step S202, the energy detector 2 transmits the battery energy saving control signal to the control unit 3. In step S203, the control unit 3 controls the mobile telephone to enter a sleep mode state within a shortened time period according to the battery energy saving control signal, i.e., changes the default time period value of the mobile telephone from the predetermined first time period value to the predetermined second time period value.

In step S204, the power source detector 8 detects whether a mains power source is connected to (or another battery 1 is installed on (not shown)) the mobile telephone in real time. If no mains power source is connected to the mobile telephone, the procedure repeats step S204 described above. If the mains power source is connected to the mobile telephone, in step S205, the power source detector 8 transmits the energy restoring control signal for restoring an initial voltage. In step S206, the control unit 3 restores the predetermined first time period value according to the energy restoring control signal.

Figure 3:
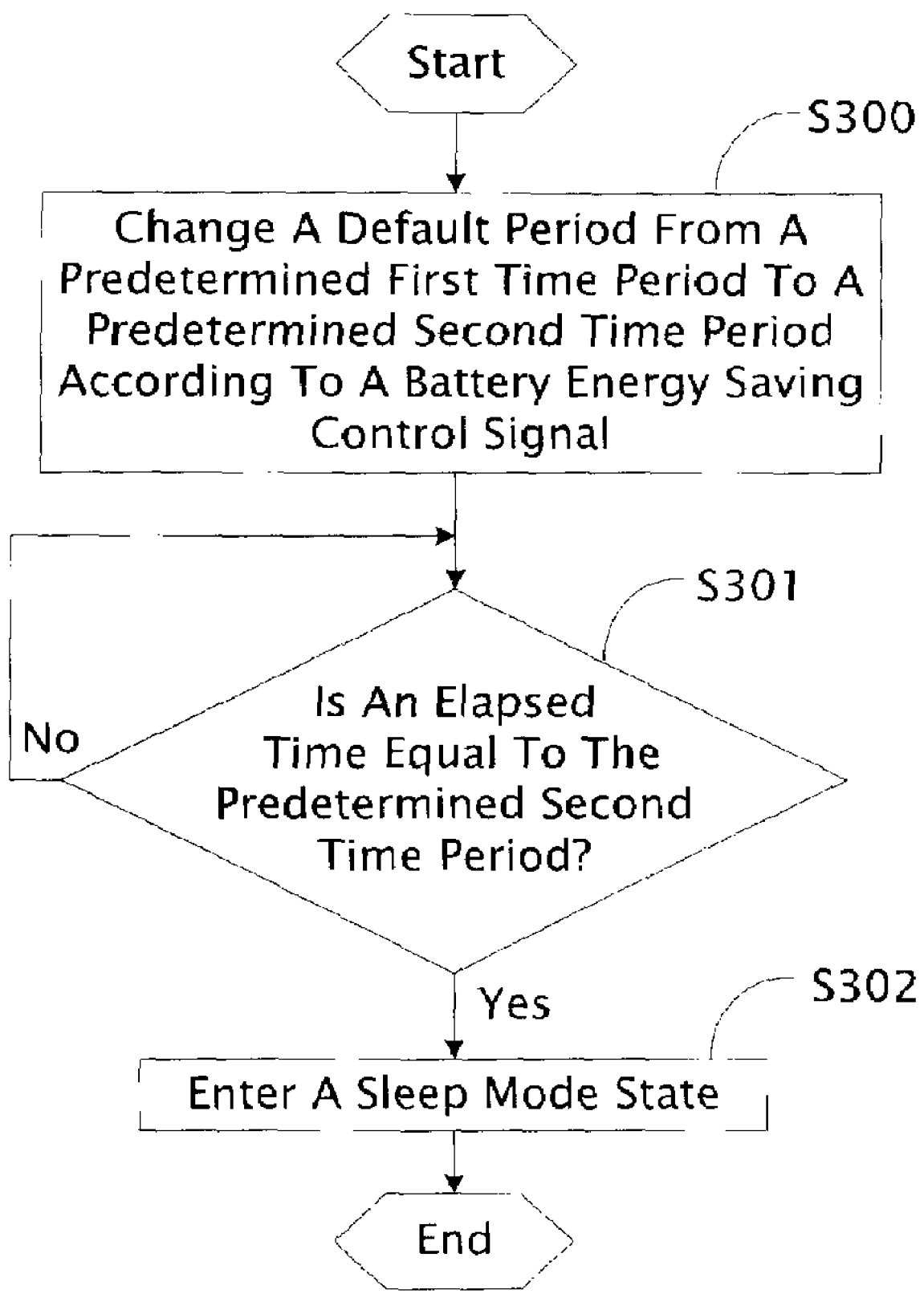
FIG. 3 is a flowchart of implementing one step of the method of FIG. 2, naming controlling a mobile telephone to enter a sleep mode state within a shortened time period.

FIG. 3 is a flowchart of implementing step S203 of the method of FIG. 2, namely controlling the mobile telephone to enter a sleep mode state within a shortened time period. In step S300, the control unit 3 changes the default time period for the mobile telephone from the predetermined first time period to the predetermined second time period according to the battery energy saving control signal. In step S301, the control unit 3 determines whether the elapsed time of the timer 5 is equal to the predetermined second time period. If the elapsed time is not equal to the predetermined second period, the procedure repeats step S301. If the elapsed time reaches the predetermined second period, in step S302, the control unit 3 controls the mobile telephone to enter the sleep mode state.

Although the present invention has been specifically described on the basis of the preferred embodiment including the preferred method, the invention is not to construed as being limited thereto. Various changes or modifications may be made to the embodiment including the method without departing from the scope and spirit of the invention.

What is claimed is:

1. An energy saving system used in an electronic device, the system comprising:
    an energy detector for measuring a energy level of a battery of the electronic device, and transmitting a battery energy saving control signal when the measured energy level is equal to or less than a predetermined energy level; and
    a control unit for changing a predetermined first time period into a predetermined second time period which is shorter than the predetermined first time period according to the battery energy saving control signal, and controlling the electronic device to enter a sleep mode state when an elapsed time of not receiving any operations on the electronic device reaches the predetermined second time period.

2. The energy saving system as described in claim 1, wherein the time period is a time interval between a state of not receiving any operation on the electronic device and a sleep mode state of the electronic device.

3. The energy saving system as described in claim 1, further comprising a power source detector for detecting whether a mains power source is connected to the electronic device, and transmitting a energy restoring control signal for restoring an initial voltage supplied to the electronic device.

4. The system as described in claim 3, wherein the control unit controls the electronic device to restore the predetermined first period for the electronic device according to the energy restoring control signal.

5. An energy saving method used in an electronic device, the method comprising the steps of:
    measuring a energy level of a battery of the electronic device;
    transmitting a battery energy saving control signal when the measured energy level is equal to or less than a predetermined energy level; and
    changing a predetermined first time period into a predetermined second time period that is shorter than the predetermined first period according to the battery energy saving control signal; and
    controlling the electronic device to enter a sleep mode state when an elapsed time of not receiving any operations on the electronic device reaches the predetermined second time period.

6. The energy saving method as described in claim 5, wherein the time period is a time interval between a state of not receiving any operation on the electronic device and a sleep mode state of the electronic device.

7. The method as described in claim 5, further comprising the steps of:
    determining whether a mains power source is connected to the electronic device;
    transmitting a energy restoring control signal for restoring an initial voltage supplied to the electronic device when the mains power source is connected to the electronic device; and
    controlling the electronic device to restore the predetermined first time period according to the energy restoring control signal.

\* \* \* \* \*